United States Patent
Greenspan et al.

(10) Patent No.: US 7,508,753 B2
(45) Date of Patent: *Mar. 24, 2009

(54) PACKET REDIRECTION AND MESSAGE STREAM MANAGEMENT

(75) Inventors: Steven Lloyd Greenspan, Scotch Plains, NJ (US); Richard H. Janow, South Orange, NJ (US)

(73) Assignee: AT&T Intellectual Property, II, L.P., Bedminster, NJ (US)

( * ) Notice: Subject to any disclaimer, the term of this patent is extended or adjusted under 35 U.S.C. 154(b) by 808 days.

This patent is subject to a terminal disclaimer.

(21) Appl. No.: 10/955,078

(22) Filed: Sep. 30, 2004

(65) Prior Publication Data

US 2005/0195836 A1  Sep. 8, 2005

Related U.S. Application Data

(63) Continuation of application No. 09/485,051, filed on Jan. 31, 2000, now Pat. No. 6,850,484.

(51) Int. Cl.
*H04L 12/46* (2006.01)
*H04L 12/66* (2006.01)
*G06F 13/00* (2006.01)

(52) U.S. Cl. .................. 370/218; 370/235; 370/352; 370/401; 370/428; 379/88.17; 379/93.07; 709/203; 709/231; 709/238; 709/249

(58) Field of Classification Search .............. 370/218, 370/235, 352, 401, 428; 379/88.17, 93.07; 709/203, 231, 238, 249
See application file for complete search history.

(56) References Cited

U.S. PATENT DOCUMENTS

| 5,193,151 A | 3/1993 | Jain |
| 5,440,547 A | 8/1995 | Easki |
| 5,491,693 A | 2/1996 | Britton |
| 5,633,916 A | 5/1997 | Goldhagen |

(Continued)

FOREIGN PATENT DOCUMENTS

EP  0762704 A2  12/1997

OTHER PUBLICATIONS

Meempat, "Combined Access Control and Routing for Connection Oriented Traffic in High-Speed Networks: A Two Level Approach", May 6, 1997, 20 pages, Elsevier.

*Primary Examiner*—Alpus H Hsu
(74) *Attorney, Agent, or Firm*—Michael Haynes PLC; Michael N. Haynes (57) ABSTRACT

A stream manager provides a way of redirecting and managing messaging and information access in a packet network environment. The stream manager is linked to a packet network, such as the Internet. The stream manager receives over the packet network a message from a user's host server initiated by a user and intended for a destination site. The message bears an address for the stream manager which is provided to the host server by the address server for the packet network, such as a server utilized as part of the domain name system. The stream manager determines the availability of at least one destination server at the destination site to receive and process the message. If a destination server at the destination site is available to receive and process the message, the stream manager selects a destination server from those available.

29 Claims, 6 Drawing Sheets

U.S. PATENT DOCUMENTS

| | | | |
|---|---|---|---|
| 5,671,225 A * | 9/1997 | Hooper et al. | 370/468 |
| 5,732,078 A | 3/1998 | Arango | |
| 5,774,660 A * | 6/1998 | Brendel et al. | 709/201 |
| 5,790,548 A | 8/1998 | Sistanizadeh | |
| 5,818,842 A | 10/1998 | Burwell | |
| 5,822,523 A | 10/1998 | Rothschild | |
| 6,006,264 A * | 12/1999 | Colby et al. | 709/226 |
| 6,018,766 A | 1/2000 | Samuel | |
| 6,070,191 A * | 5/2000 | Narendran et al. | 709/226 |
| 6,075,783 A * | 6/2000 | Voit | 370/352 |
| 6,098,108 A * | 8/2000 | Sridhar et al. | 709/239 |
| 6,122,255 A * | 9/2000 | Bartholomew et al. | 370/237 |
| 6,128,279 A * | 10/2000 | O'Neil et al. | 370/229 |
| 6,154,738 A * | 11/2000 | Call | 707/4 |
| 6,154,745 A * | 11/2000 | Kari et al. | 707/100 |
| 6,185,619 B1 * | 2/2001 | Joffe et al. | 709/229 |
| 6,324,582 B1 * | 11/2001 | Sridhar et al. | 709/230 |
| 6,324,585 B1 * | 11/2001 | Zhang et al. | 709/245 |
| 6,356,948 B1 | 3/2002 | Barrett | |
| 6,496,501 B1 * | 12/2002 | Rochkind et al. | 370/354 |
| 6,502,135 B1 * | 12/2002 | Munger et al. | 709/225 |
| 6,591,306 B1 * | 7/2003 | Redlich | 709/245 |
| 6,791,971 B1 * | 9/2004 | Osman et al. | 370/352 |
| 6,820,133 B1 * | 11/2004 | Grove et al. | 709/238 |
| 6,822,955 B1 * | 11/2004 | Brothers et al. | 370/389 |
| 6,829,654 B1 * | 12/2004 | Jungck | 709/246 |
| 6,985,494 B2 * | 1/2006 | Thompson | 370/466 |
| 7,003,555 B1 * | 2/2006 | Jungck | 709/219 |
| 7,203,190 B1 * | 4/2007 | Ruban et al. | 370/356 |

\* cited by examiner

PACKET REDIRECTION AND MESSAGE STREAM MANAGEMENT

CROSS-REFERENCE TO RELATED APPLICATIONS

This application is a continuation of, claims priority to, and incorporates by reference pending U.S. application Ser. No. 09/485,051, filed 31 Jan. 2000 now U.S. Pat. No. 6,850,484.

TECHNICAL FIELD

This invention relates to packet network communications in general and, more particularly, provides a way of redirecting and managing messaging and information access over a packet network.

BACKGROUND OF THE INVENTION

Packet networks are general-purpose data networks which are not tied to fixed-bandwidth circuits. Instead, they are designed to transmit bits (in the form of a packet of fixed or variable length) only when there are bits to transmit. Packet networks are well suited for sending stored data of various types, including messages, fax, speech, audio, video and still images. Typically, one accesses a packet network through a client program executing on a personal computer (PC), and so packet networks are inherently client/server driven. Packet networks provide access to distributed databases and have excellent search capabilities.

There are millions users of packet networks in the United States, many of whom use the Internet (the largest and most renowned of the existing packet networks). The number of Internet users is growing rapidly and will continue to do so over the next decade. The Internet is implemented using a large variety of connections between computers spread throughout the United States and even across much of the globe; included are several subnetworks (sometimes called "backbone" networks) used to carry digital "traffic" on the Internet. These interconnected computers can support applications, such as electronic mail and the World Wide Web, which facilitate communications between persons across the U.S. or around the globe. Users typically communicate over the Internet using a combination of hardware and software providing interconnectivity that is compatible with the Transmission Control Protocol/Internet Protocol (TCP/IP).

Communication on the Internet is inherently unlike commercial telephony in that it is connectionless—that is, there is no physical channel assigned to the "connection." Instead, packets of information are relayed through the network from source to destination server. When no packets are currently being sent, there is no load on the transmission system. A communication failure occurs when packets are either lost (as might happen via queue overload at any node) or more often, when the load (i.e., queue of packets along with time to process each) at any processor is so long that a timeout is issued by the originator.

One type of computer used in establishing connections within the Internet is known as a server. Typically, servers used in connection with the Internet are operated by or on behalf of institutions or businesses attempting to provide timely and responsive communication or information services. Functionally, such services are analogous to communications services that terminate Public Switched Telephone Network (PSTN) calls, such as, e.g., voice mail, interactive voice response services, customer care, sales, etc.

Today, the Internet is often used to request information from, or to send information to, an individual or a private or public organization. Examples of such activities include World Wide Web browsing, e-mail, inter-relay chat (IRC) and its Internet telephony incarnation. A person requesting or sending information shall be referred to herein as the source or sender, and the recipient of such a transmittal shall be referred to herein as the destination or recipient (with the understanding that the functional roles are reversed when the recipient replies). In each case, the sender addresses a message to a destination using a Uniform Resource Locator (URL) or an Internet Protocol (IP) address.

In a typical Web browsing session, a World Wide Web (WWW) user specifies a URL for the browser to "contact" for information. A URL is essentially a hierarchical access key that uniquely specifies a unit of content in a remote database that he wishes to reach. The content so referred to is often called a "Home Page" if it is regarded as the root node of a hierarchical data structure (sub-tree beneath it) or a sub-page if it is associated with a leaf node of such a tree. Each server has one or several "Home Pages" within it.

The URL address allows a user to select either the root or any of the sub-levels within any tree. In that sense, the address serves a function analogous to a telephone number, but in addition a URL has indefinite length allowing the equivalent of extensions to be specified to any level. Part of the URL translates directly into a network address for the destination server, by means of the Domain Name System (DNS) that is essentially a set of reference address servers that respond to URL contact requests by looking up the IP address corresponding to textual URLs.

When a user specifies a URL or selects a "hot link" or hyperlink on content already displayed, a DNS server supplies the IP address to be used in the header portion corresponding to the IP address for packets intended to be sent to the site corresponding to the URL. The user's computer initiates contact by emitting one or more packets of data that traverse the Internet network and are processed by the receiving server. The receiving server then returns one or more packets of data to the user terminal, also over the Internet. The transfer of requests or information typically requires many packets. Because some packets transmitted across the Internet may be delayed because of network congestion and arrive after a receiving server has timed out, network congestion can cause communication failure.

In the current Internet and in the Internet envisioned under Internet Protocol Version 6 (IPv6, the next generation Internet protocol), senders are now and are likely to continue to be confronted by "busy" messages when the destination is not functioning or is overloaded, or because network traffic is congested. Often, such messages give no real indication of what is happening. In any event, the requested transmission or interactive exchange ends abruptly, and the user must, at his or her own initiative, try again later. For busy sites, many such interactive attempts must be made before establishing a connection with the site, wasting users' time, reducing their efficiency and creating frustration.

For example, in the current art, assume that a user initiates a request for information found over a packet network (e.g., the Internet) at a destination (e.g., web page) by selecting a hyperlink displayed on a PC. The request is formulated by a gateway server (e.g., a host server operated by an Internet service provider) as a data message to a DNS server. In response, the DNS server returns to the requesting server an IP address corresponding to the intended destination. This destination address is then used in the header of a datagram. In the simplest case, the address might be construed as "IP (user), IP(destination)," the IP addresses associated with the user's gateway and the destination server. The datagram is then routed through the packet network. To reply, the destination formats the reverse IP address "IP(destination), IP(user)." The destination server may respond automatically (as in a web page request), may store the received message (as in E-mail), or may forward the message to a customer premises terminal (as in IRC).

In IPv6, the sending server may specify a subnetwork provider over which traffic should be routed. In this case, then, the user's gateway server would specify the address "IP(user), subnetwork, IP(destination)" and the destination would specify "IP(destination), subnetwork, IP(user)" as the return address. If the desired network is congested or inoperative, the gateway server used by the user would ultimately format an "error" message to the user's PC In that case, the user could then select another subnetwork and re-try; there is even some suggestion of dynamic subnetwork selection in real time. However, such selections would be done only as a means to avoid network congestion; subnetwork selections do not address server congestion at the destination site.

Traditionally, Internet users have been willing to tolerate delays because they have not usually attempted business activities. With growing interest in commercial use of the World Wide Web and Internet telephony, however, customers will expect higher levels of customer service, such as the level of services comparable to those that have been delivered in voice telephony.

While one approach to providing better response may be to provide extremely high bandwidth networks with great overcapacity (e.g., a private network, or a network based on advanced technology, such as ATM fast packet switching), such an approach does not address the issue described above, which is due to traffic congestion in the network comprising the Internet and the servers connected to the Internet together with an inherently primitive way of dealing with "busy" conditions.

What is desired is a way to improve handling of messaging, including handling of requests for information and reduction of returned "busy" messages in a packet network environment.

SUMMARY OF THE INVENTION

The present invention is directed to a way of redirecting and managing messaging and information access in a packet network environment. The stream manager comprises a computer-based router or server that behaves as if it were a gateway for a sub-network of destination site servers, and the stream manager is linked to a packet network, such as the Internet. The packet network has an address server, such as a server utilized as part of the domain name system. The stream manager receives over the packet network a message from a user's host server initiated by a user and intended for a destination site. The message bears an address for the stream manager which is provided to the host server by the address server for the packet network. The stream manager determines the availability of at least one destination server at the destination site to receive and process the message. If a destination server at the destination site is available to receive and process the message, the stream manager selects a destination server from those available, and initiates the routing of the message to the selected destination server. If a destination site is unavailable, the stream manager may report that to the host server, along with other information (such as customer care or promotional information).

DETAILED DESCRIPTION

The present invention is directed to a way of improving message handling over a packet network, such as the Internet. The proposed invention alleviates the shortcomings of the current art and provides new network services using three alternative methods: (1) tail-end stream management, (2) network-based redirection and (3) destination-based redirection.

Figure 1:
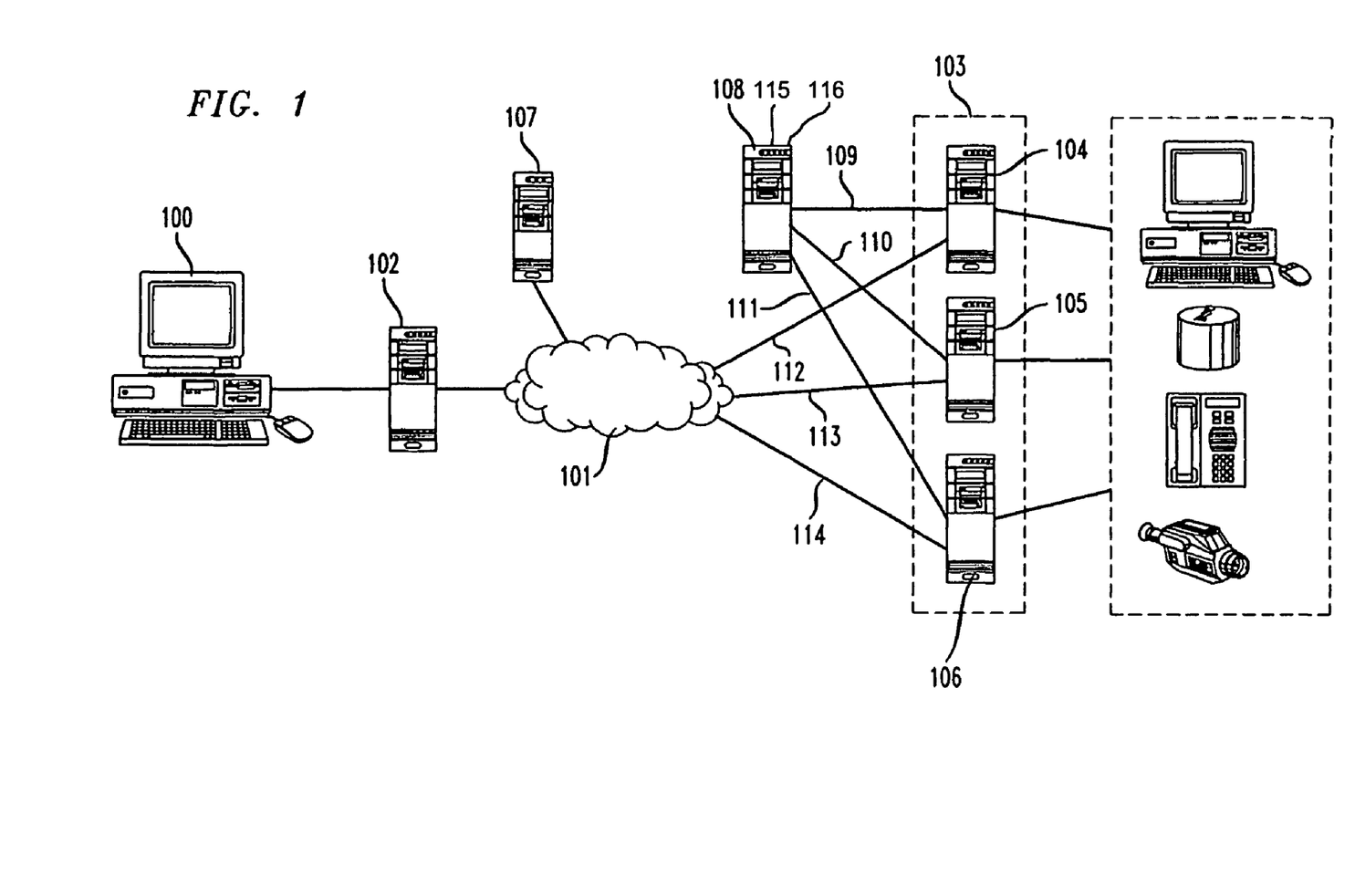
FIG. 1 shows the relationship of packet network servers and a stream manager in accordance with the present invention.

For purposes of illustration, in accordance with the present invention, a user desires to request information, to send information, or to establish a real-time connection with another user over a packet network, such as the Internet or its corporate imitator, an intranet, and that the communications would be accomplished through packet network host servers. These relationships are illustrated in FIG. 1. Using a personal computer (PC), a sending user 100 establishes a connection with packet network 101 through host server 102. User 100 may also have other communications devices available, such as a Plain Old Telephone Service (POTS) telephone, or a video camera, to provide multimedia information. Packet network 101 may, illustratively, be the Internet or an intranet; it may consist of a single packet network or a multiplicity of packet networks, such as e.g., the backbone networks comprising the Internet. Host server 102 may, illustratively, be a server connected with the Internet provided by, e.g., an Internet service provider, or may be any other server used for providing access to packet network 101.

1. Tail-end Stream Management

In one embodiment of the present invention, a destination or recipient site 103, which user 100 wishes to contact, may be accessed over packet network 101 through a single host server or through one of several destination host servers, e.g. the three destination servers illustratively shown as servers 104 through 106 in FIG. 1. A multiplicity of host servers, such as destination servers 104 through 106 illustrated in FIG. 1, may be utilized in providing multiple shared access by different users of packet network 101 to information sources (such as, e.g., databases, audio, video or other multimedia information) available at destination site 103 (which may be, e.g., a site for an institution or a business). In the case where destination site 103 is for an individual, access may typically be made to destination site 103 through a single host server, e.g. server 104. Destination site 103 may be associated with any number of information or service suppliers that a typical user, such as user 100, may desire to access.

Packet network 101 also typically has at least one domain name or DNS server 107, and there may be a multitude of such DNS servers present. DNS server 107 is a reference server that responds to URL contact requests by looking up an IP address corresponding to a requested textual URL. In accordance with the present invention, stream manager 108 interconnects with packet network 101 and destination site 103 to enable control of message traffic using tail-end stream management. In tail-end stream management, a URL address corresponding to a certain destination, such as destination site 103, is translated by DNS server 107 to an IP address corresponding to stream manager 108.

In handling a message intended for a destination site, stream manager 108 obtains any necessary information (such as an address) for identifying the destination site from information contained in the datagrams carrying the message (either in the header or in the accompanying payload data). A sequence of events occurring in accordance with the present invention is described with reference to the flow chart of FIG. 2 (reference numbers beginning with a '1' correspond to the reference numbers shown in FIG. 1). When user 100 attempts to contact destination site 103 via a URL associated with destination site 103, at step 201 the user's host server 102 sends the URL to DNS server 107. At step 202, DNS server 107 returns to host server 102 the IP address for stream manager 108 as well as identifier (such as an IP address) corresponding to destination site 103. Such information may be henceforth passed between host server 102 and stream manager 108 and between stream manager 108 and the destination site 103 using a packet header, which allows for greater speed when compared to passing address or other identifier information (e.g., a URL corresponding to the destination site) in the payload (i.e., in the message); however, the information may be passed in the payload.

Figure 2:
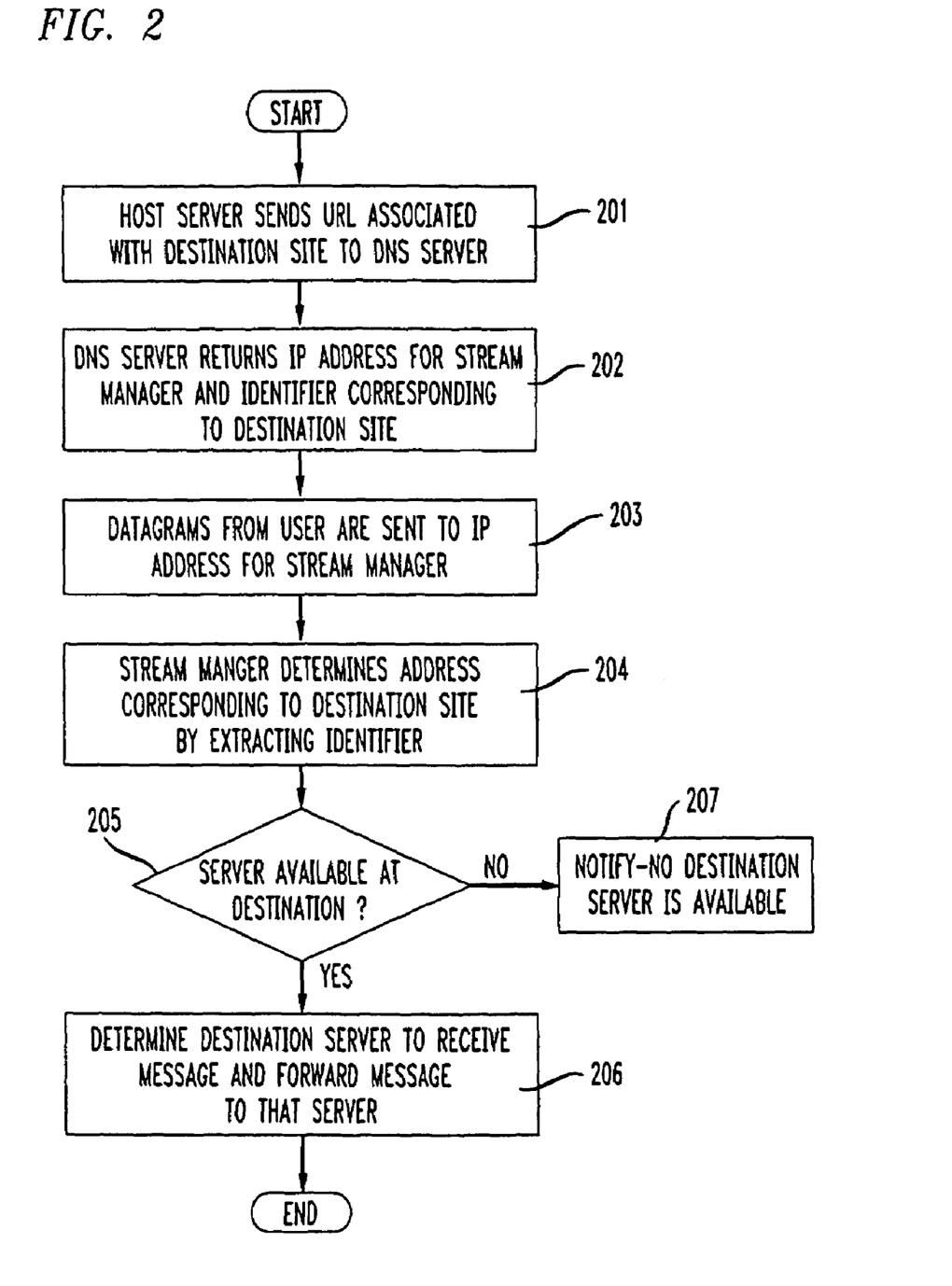
FIG. 2 shows a sequence of events for tail-end stream management occurring in accordance with the present invention.

At step 203, one or more datagrams are then sent by user 100 through host server 102 to the address for stream manager 108 returned by DNS server 107 and are received by stream manager 108. At step 204, stream manager 108 determines an address for destination site 103 by extracting an identifier corresponding to the destination site. The extracted identifier could be an IP address for site 103 as returned by DNS server 107. Alternatively, other information representing an identifier for site 103 (such as a URL corresponding to site 103) could be extracted by stream manager 108, which would then need to complete its determination of an IP address for destination site 103 from the identifier. Stream manager 108 then determines at step 205 whether there is an available destination server. If so, at step 206 stream manager 108 then selects which one of the available destination servers in site 103 (server 104, server 105 or server 106) should receive the message from user 100; stream manager then initiates the routing of the message to the selected destination server by forwarding the message to the selected destination server. If no destination server is available, at step 207 stream manager 108 generates a response—such as a "busy" message—reporting to user 100 that no destination server is available and sends the notice to user 100 via host server 102. Additionally, other information, such as, for example, advertising or other promotional information or customer care messages, may be included in a response message returned to the user from the stream manager.

The criteria affecting the particular response by stream manager 108 could include relative traffic load on the servers 104, 105 and 106 and the availability of the requested information or service. If no server is available, stream manager 108 could return a predefined message or message template indicating that the request could not be filled at the present time and advantageously that the request was logged and that the requested information would be sent to user 100 at a later time. In the case of real-time chat or telephony such arrangements could be used to support customer care or calling centers (i.e., a set of agents arranged to handle distribution of calls arriving to a common site).

Also among the criteria affecting the response by stream manager 108 could be the selecting of an appropriate destination server (i.e., one of destination servers 104, 105 or 106) based upon information about the user, such as the user's prior interaction with the destination. Thus, for example, if user 100 has previously interacted with the destination through a particular destination server, the appropriate destination server to handle the current message may be the same server, and stream manager 108 could forward the message from user 100 to that same destination server. As another example, information about the location of user 100 (e.g., the location of the user's host server) could be used to select a destination server appropriate for handling messages from that location.

An application at destination site 103 may control the amount of interaction stream manager 108 has with the user's host server 102 after the destination server has been selected and successfully reached. Thus, the destination server could determine that subsequent messages between host server 102 and the selected destination server are routed through stream manager 108 or alternatively, that subsequent messages could be sent between host server 102 and the selected destination server without any further interaction or involvement of stream manager 108. If destination site 103 retains involvement of stream manager 108, site 103 could instruct stream manager 108 to route further communications from user 100 to the same selected destination server. As an additional choice by destination site 103 could be to instruct stream manager 108 to return to host server 102 certain information, such as resource allocation information (e.g., reserved networks or other resources needed for the communication session with user 100).

In an alternative embodiment of the present invention, data connections between stream manager 108 and destination servers 104, 105 and 106 could be used to provide site congestion information (e.g., message traffic load and capacity) to stream manager 108. Further, reply messages sent back from one of the host servers 104, 105 or 106 to user 100 through host 102 could be directed through stream manager 108 to allow stream manager 108 to measure service quality.

Note that in routing messages to destination servers 104, 105 or 106, stream manager 108 could use a private connection (i.e., a network other than packet network 101), such as communications links 109, 110 or 111 shown in FIG. 1 that correspond to servers 104 through 106, respectively. Alternatively, stream manager 108 could route messages to destination servers 104, 105 and 106 through a path that includes packet network 101, where servers 104 through 106 have connections to packet network 101 via communications links 112, 113 and 114, respectively, as shown in FIG. 1.

In accordance with the present invention, each URL request made by user 100 to destination site 103 would be routed to network-based stream manager 108, designated by an address supplied by DNS server 107. Stream manager 108 acts as a buffer, message storage, and control center for traffic flow into and out of the set of destination servers 104 through 106, including the destination server which ultimately is determined to be the one to process the particular request made by user 100. Among the tasks that stream manager 108 may perform for incoming requests made to a URL corresponding to destination site 103 and for outgoing traffic are:

(1) To maintain a measure of the traffic load on each destination server for which it handles traffic. This may include using a model for processing loads for each URL that can be invoked.

(2) To feed requests to each destination server platform at a rate consistent with its currently-available (or projected) capacity and load.

(3) To use information about the user (such as the location of the user or user's prior interaction with the destination) to select an appropriate destination server.

(4) To generate "busy-please wait" return messages to user 100, the originator of the request made to destination site 103, if in fact no destination server is currently available to process the request. These messages may be processed by terminal equipment at the station of user 100 or advantageously by other "message center" nodes serving the user.

(5) To ensure that returning datagrams are rerouted to a front-end mailbox associated with user 100, if required by and encoded into requests from user 100. Stream manager 108 would extract from the user's request and store the return information describing both the front-end mailbox for the user and the user's own IP address, and then merge this information into return traffic (content items typically) sent by the destination server to the stream manager.

In another embodiment of the present invention, stream manager 108 might be integral with a network node serving as a proxy address for the actual destination server. For example, it might be an intranet gateway having the customer's web servers connected directly to it, or a powerful gateway server with built-in stream management.

Figure 3:
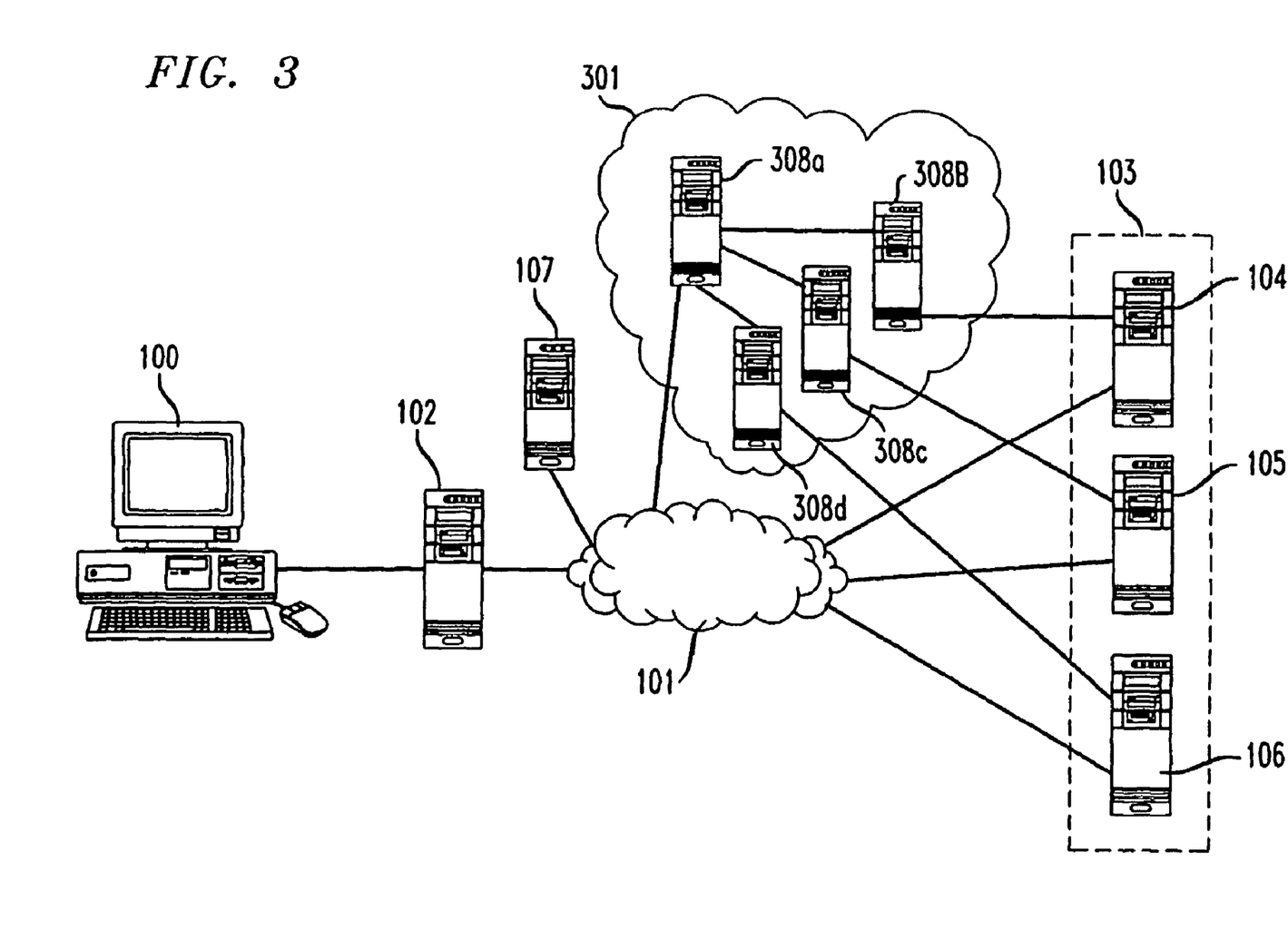
FIG. 3 shows the relationship of packet network servers and stream managers in accordance with an alternative embodiment of the present invention.

Alternatively, as shown in FIG. 3, the stream manager may be comprised of an intranet gateway or single gateway server 308*a* along with a set of stream manager servers (illustratively shown as 308*b*, 308*c* and 308*d* in FIG. 3) located remotely from gateway 308*a* and interconnected with gateway 308*a* by an internal network 301 (reference numbers in FIG. 3 beginning with a '1' correspond to the reference numbers shown in FIG. 1). Network 301 is internal to the stream manager and may be any kind of network, such as an intranet, suitable for communicating between gateway 308*a* and one of the servers 308*b*, 308*c* or 308*d*. Thus, with reference to the sequence shown in FIG. 2, the address for the stream manager returned by DNS server 107 would be the address for gateway 308*a*. In such cases, gateway 308*a* would incorporate an index or a forwarding function for a URL request, which might be advantageously implemented by a substitution table (i.e., lookup table) which looks up the network address for one of the available stream manager servers, such as, illustratively, servers 308*b*, 308*c* or 308*d* as shown in FIG. 3, to handle the message. Routing a message through a specific stream manager server by the gateway, and subsequent activity (such as, e.g., routing only a subset of incoming packet sequence i.e., those that require significant processing and storage while passing other traffic through directly to the destination node) may be determined on a customer-by-customer basis.

2. Network-based Redirection

In an alternative embodiment of the present invention, stream manager 108 could reply to a request made by user 100 by returning to host server 102 a redirection message that would, in turn, specify an IP address corresponding to a determined destination server among servers 104, 105 or 106. In this case, all subsequent traffic would flow directly between user 100 (through host server 102) and the chosen destination server, e.g., destination server 104, without the need to route messages through stream manager 108.

Figure 4:
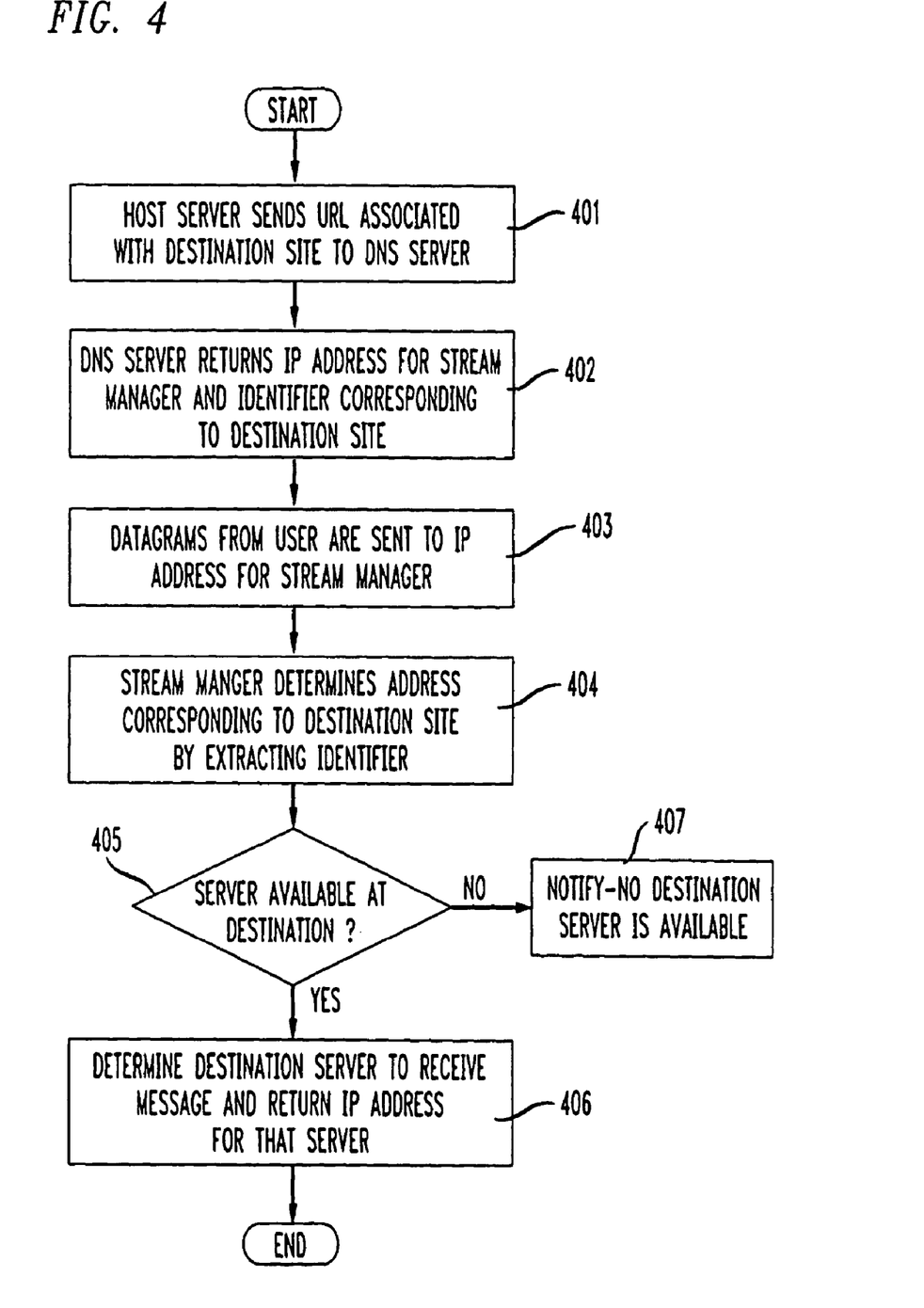
FIG. 4 shows a sequence of events for network-based redirection occurring in accordance with an alternative embodiment of the present invention.

With reference to the flow chart of FIG. 4, a sequence of events occurring in accordance with this alternative embodiment the present invention will be described in more detail (reference numbers beginning with a '1' correspond to the reference numbers shown in FIG. 1). When user 100 attempts to contact destination site 103 via a URL associated with destination site 103, at step 401 the user's host server 102 sends the URL to DNS server 107. At step 402, DNS server 107 returns to host server 102 the IP address for stream manager 108 as well as identifier (such as an IP address) corresponding to destination site 103. Such information may be henceforth passed between host server 102 and stream manager 108 and between stream manager 108 and the destination site 103 using a packet header, which allows for greater speed when compared to passing address or other identifier information (e.g., a URL corresponding to the destination site) in the payload (i.e., in the message); however, the information may be passed in the payload.

At step 403, one or more datagrams are then sent by user 100 through host server 102 to the address for stream manager 108 returned by DNS server 107 and are received by stream manager 108. At step 404, stream manager 108 determines an address for destination site 103 by extracting an identifier corresponding to the destination site. The extracted identifier could be an IP address for site 103 as returned by DNS server 107. Alternatively, other information representing an identifier for site 103 (such as a URL corresponding to site 103) could be extracted by stream manager 108, which would then need to complete its determination of an IP address for destination site 103 from the identifier. Stream manager 108 then determines at step 405 whether there is an available destination server. If so, at step 406 stream manager 108 then selects which one of the available destination servers in site 103 (server 104, server 105 or server 106) should receive messages from user 100. Stream manager 108 then initiates the routing of the message to the selected destination server by returning to user 100, through host server 102, the IP address for the selected destination server such that user 100 can then send and receive messages or other information, data or content from the selected destination server without routing through stream manager 108. If no destination server is available, at step 407 stream manager 108 generates a response— such as a "busy" message—notifying user 100 that no destination server is available and sends the notice to user 100 via host server 102. Additionally, other information, such as, for example, advertising or promotional information or customer care messages, may be included in a response message returned to the user from the stream manager.

Similar to tail-end stream management, criteria for choosing among the alternative destination servers in network-based redirection could be relative traffic load on the servers 104 through 106, the availability of the requested information or service, and user information for selecting an appropriate destination server. If no server is available, stream manager 108 could return a predefined message or message template indicating that the request could not be filled at the present time and advantageously that the request was logged and that the requested information would be E-mailed at a latter time. In the case of real-time chat or telephony such arrangements could be used to support customer care or call centers.

3. Destination-Based Redirection

Figure 5:
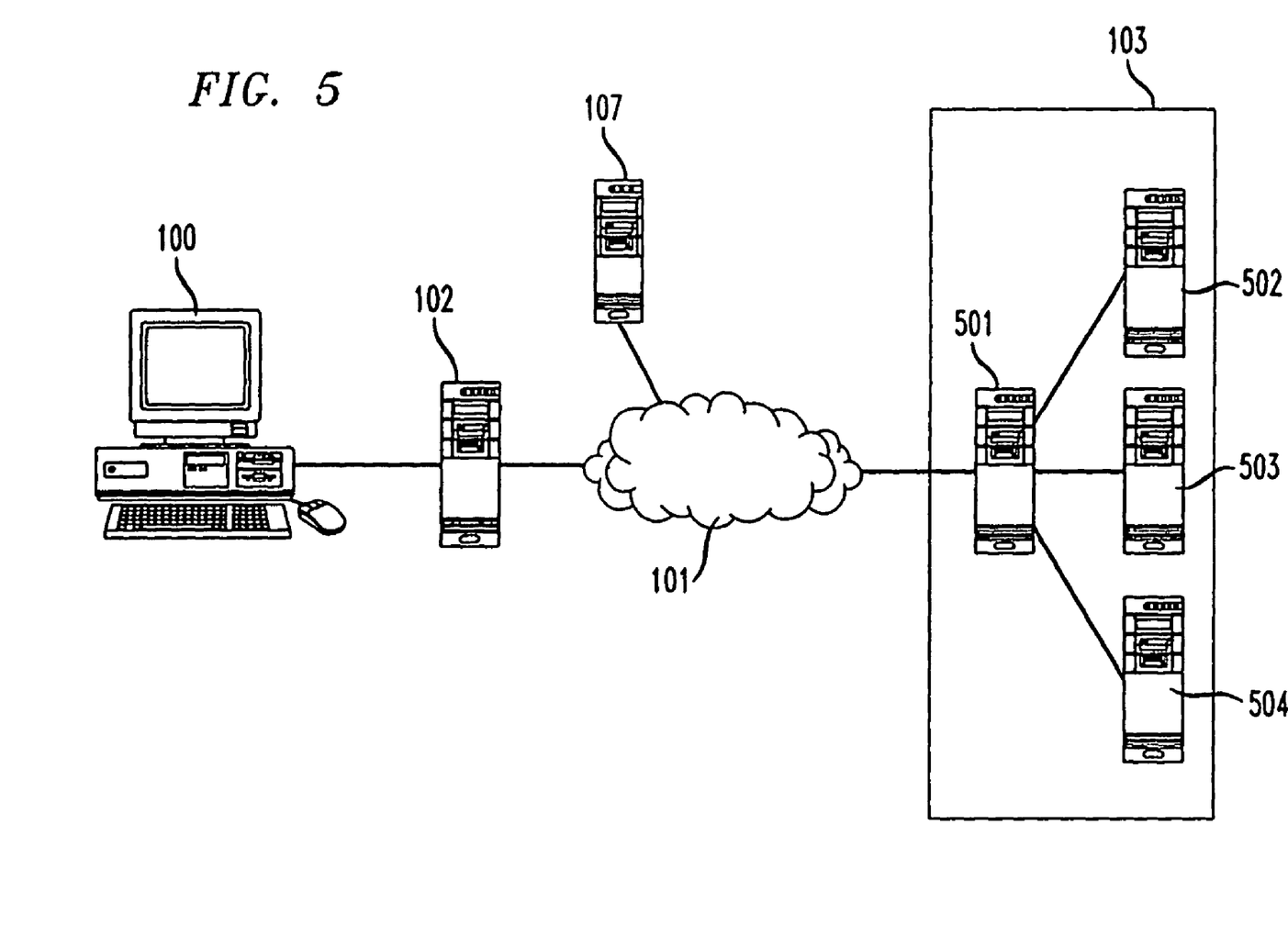
FIG. 5 shows the relationship of packet network servers and stream manager for destination-based redirection in accordance with an alternative embodiment of the present invention.

In another alternative implementation, a stream manager wholly separate from the destination site, such as stream manager 108 as shown in FIG. 1, would not be addressed at all. Rather, the IP address corresponding to a stream manager that is in fact a peripheral server associated with the destination site would be specified by the DNS server as the corresponding destination IP address. The relationships are shown in FIG. 5 (reference numbers beginning with a '1' correspond to the reference numbers shown in FIG. 1). Destination site 103 may be accessed over packet network 101 through destination stream manager 501. In the case of a business or institution, there may, in addition, be one or more destination servers, such as destination servers 502 through 504 as shown in FIG. 5, which may be utilized in providing multiple shared access by different users of packet network 101 to information sources (such as, e.g., databases, audio, video or other multimedia information) available at destination site 103. In the case where destination site 103 is an individual, access may be made to destination site 103 through a single host server, e.g. server 502. Destination site 103 may be associated with any number of information or service suppliers that a typical user, such as user 100, may desire to access.

As discussed before with respect to FIG. 1, packet network 101 also typically has at least one domain name or DNS server 107, and there may be a multitude of such DNS servers present. DNS server 107 is a reference server that responds to URL contact requests by looking up an IP address corresponding to a requested textual URL. In accordance with the present invention, destination stream manager 501 is a computer-based server that acts as a gateway for a sub-network of destination servers, such as servers 502, 503 and 504 associated with destination site 103. Destination stream manager 501 responds to an initial request from user 100 with a redirection message, so that subsequent messages to or from user 100 would be sent between host server 102 and the determined destination server 502, 503 or 504; the process is similar to that described above with respect to FIG. 4, with the exception that a destination identifier need not be extracted (the stream manager is already located at the destination site). Destination servers 502, 503 and 504 could be, e.g., telephony devices (such as packet telephony devices) for real-time data communications, in which case stream manager 501 acts in a role analogous to that of a central office switch in the PSTN.

Again, the criteria for choosing among the alternative destination servers could be relative traffic load on the destination servers 502-504, the availability of the requested information or service, and user information for selecting an appropriate destination server. If no server is available, destination server 501 could return a predefined message or message template indicating that the request could not be filled at the present time and advantageously that the request was logged and that the requested information would be sent to user 100 at a latter time. In the case of real-time chat or telephony such arrangements could be used to support customer centers.

4. Multiple Packet Networks

Figure 6:
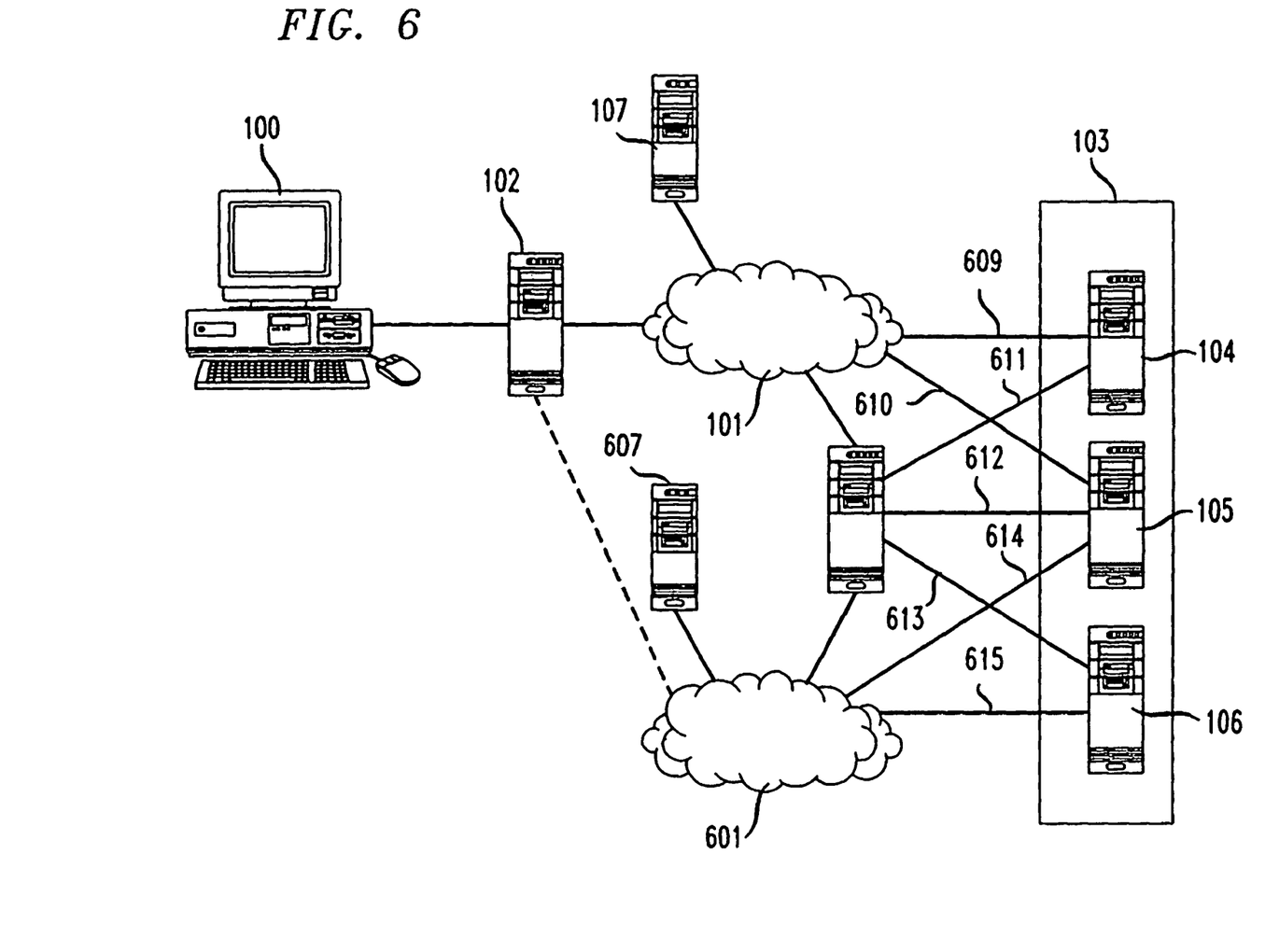
FIG. 6 shows the relationship of packet network servers and stream manager for a plurality of networks in accordance with an alternative embodiment of the present invention.

In an alternative embodiment of the present invention, the stream manager of the present invention may operate in a multiple packet network environment such that a packet network may be selected from a plurality of packet networks. As shown in FIG. 6, destination servers 104 through 106 may, illustratively, be connected to packet network 101 and/or to a second packet network 601 (reference numbers beginning with a '1' correspond to the reference numbers shown in FIG. 1). Packet network 601 typically would have at least one DNS server, shown in FIG. 6 as DNS server 607.

In this scenario, a message may be received from a user's host server though packet network 101 or packet network 601; for purposes of illustration, the user's host server is shown connected to packet network 101. Stream manager 608 directs messages to destination servers through either network 101 or network 601, whichever network has a link to the particular destination server.

Where a destination server has links to more than one packet network, one of the packet networks (e.g., network 101 or network 601) may be preferred based upon criteria such as traffic volume, availability, etc. With reference to the example shown in FIG. 6, destination server 104 has a link 609 to network 101, but no link to network 601. Thus, stream manager 608 may route messages for destination server 104 through network 101; alternatively, there may be a private link between stream manager 608 and destination server 104 that may be used for messaging.

Similarly, as shown in FIG. 6, destination server 106 has a link 615 to network 601, but no link to network 101; thus, stream manager 608 may direct messages to destination server 106 through network 601 or, alternatively, through private link 613 (if it exists). Finally, destination server 105 has a link 610 to network 101 and a link 614 to network 601 and, thus, stream manager may direct messages to destination server 105 through either network 101 or network 601 (or, alternatively, through private link 612 if it exists) depending upon any number of factors (such as, e.g., relative traffic load).

In another embodiment of the present invention, a stream manager that is used with the multiple packet network environment may be comprised of an intranet gateway or single gateway server along with a set of stream manager servers as described above with reference to FIG. 3.

Implementation. The stream manager of the present invention may be implemented as a computer-based router or server that behaves as if it were a gateway for a sub-network of destination servers, such as servers 104, 105 and 106 associated with destination site 103 (as illustrated in FIG. 1). The stream manager would have the requisite hardware 116 and software that provides an interface 115 for communicating with servers or other devices over a packet network, such as, e.g., a combination of hardware and software providing interconnectivity that is TCP/IP compatible. Methods for providing an interface with a packet network are well-known to those skilled in the art.

However, it should be pointed out that the stream manager of the present invention need not be a physical gateway; that is, the stream manager need not physically stand between servers 102 and 103 (as illustrated in FIG. 1), or between different parts of the network.

In summary, the present invention provides a way of improving message handling over a packet network, such as the Internet, using methods of tail-end stream management, network-based redirection and destination-based redirection.

What has been described is merely illustrative of the application of the principles of the present invention. Other arrangements and methods can be implemented by those skilled in the art without departing from the spirit and scope of the present invention.

What is claimed is:

1. A method comprising the steps of: at a gateway in a packet network,
   responsive to a received Domain Name System (DNS) supplied message initiated by a user, determining availability of a plurality of destination servers at a destination site, the received DNS supplied message comprising a first address of the gateway and a second address of the destination site;
selecting a destination server from the plurality of destination servers; and
initiating routing of the message to the selected destination server.

2. The method according to claim 1, further comprising:
receiving at the gateway, information about congestion at the destination site, the information about congestion including a measure of message traffic toad relative to available capacity for each available destination server, the destination server selected based upon the congestion at the destination site.

3. The method according to claim 1, further comprising:
receiving at the gateway, information about congestion a the destination site, the information about congestion transmitted over a communications link with the destination site, the communications link excluding the packet network, the destination server selected based upon the congestion at the destination site.

4. The method according to claim 1, further comprising:
directing replies from the destination site to the user through the gateway to measure service quality relating to the destination site, the destination server selected based upon the service quality.

5. The method according to claim 1, further comprising:
if no destination server is available, reporting information indicative of unavailability to the user, the information further comprising promotional information.

6. The method according to claim 1, further comprising:
if no destination server is available, informing the user that requested information will be e-mailed.

7. The method according to claim 1, further comprising:
sending promotional information to the user.

8. The method according to claim 1, further comprising:
sending customer care information to the user.

9. The method according to claim 1, further comprising:
rerouting reply messages intended for the user from the destination server to a front-end mailbox associated with the user.

10. The method according to claim 1, wherein:
a DNS server that provides the DNS supplied message selects the gateway from a plurality of gateways.

11. The method according to claim 1, further comprising:
selecting, from a plurality of packet networks, a transmission packet network for transmitting the message.

12. The method according to claim 1, further comprising:
routing the message to the selected destination server over a determined packet network.

13. The method according to claim 1, wherein the message comprises information that originates from a Plain Old Telephone Service.

14. The method according to claim 1, wherein the message comprises information that originates from a video camera.

15. The method according to claim 1, wherein the message comprises information that originates from a database.

16. The method according to claim 1, wherein the message comprises multimedia information.

17. The method according to claim 1, wherein the second address is an IP address.

18. The method according to claim 1, wherein the second address is a URL.

19. The method according to claim 1, wherein the message is routed via a private network.

20. The method according to claim 1, wherein the step of initiating routing of the message to the selected destination server comprises changing the second address.

21. The method according to claim 1, wherein the step of initiating the routing of the message to the selected destination server comprises routing the message through the packet network to an address for the selected destination server.

22. The method according to claim 1, wherein the step of initiating routing of the message to the selected destination server comprises routing the message through a network other than the packet network.

23. The method according to claim 1, wherein the step of initiating the routing of the message to the selected destination server comprises returning an address for the selected destination server to a host server associated with the user for use in sending messages from the user to the selected destination server.

24. The method according to claim 1, wherein the step of selecting a destination server includes determining which one of the plurality of destination servers has a lowest message traffic load relative to that server's available capacity, the gateway providing requests to the selected destination server at a rate consisting with a currently-available capacity and load of the selected destination server.

25. The method according to claim 1, wherein the step of selecting a the destination server includes determining which one of the plurality of destination servers is appropriate for handing the message based upon information about the user, the information about the user comprising a previous interaction of the user with a determined destination server of the plurality of destination servers.

26. The method according to claim 1, wherein the gateway's interaction with any messages to which the user and the destination site are parties is controlled by the destination site after the selected destination server has been successfully reached with the message.

27. The method according to claim 1, wherein the gateway is coupled to a plurality of gateways through an internal network.

28. The method according to claim 1, wherein the packet network is one of a plurality of packet networks.

29. A gateway comprising:
a communications interface communicatively coupleable to a packet network; and
a processor that:
responsive to a received Domain Name System (DNS) supplied message initiated by a user, selects a destination server from at least two destination servers available to receive and process the message, the message comprising a first address of the gateway and a second address of a destination site of the at least two destination servers; and
initiates the routing of the message to the selected destination server.

* * * * *